3 Sheets—Sheet 1.

W. H. WILEY.
FRUIT-DRIER.

No. 185,007. Patented Dec. 5, 1876.

Witnesses.
E. S. Bradshaw
E. W. Lecompte

Inventor.
William H. Wiley

3 Sheets—Sheet 2

W. H. WILEY.
FRUIT-DRIER.

No. 185,007.        Patented Dec. 5, 1876.

Witnesses:
E. S. Bradshaw.
E. W. Lecompte.

Inventor:
William H. Wiley

W. H. WILEY.
FRUIT-DRIER.

No. 185,007.

3 Sheets—Sheet 3.

Patented Dec. 5, 1876.

Witnesses:
E. S. Bradshaw.
E. W. Lecompte

Inventor
William H. Wiley

UNITED STATES PATENT OFFICE.

WILLIAM H. WILEY, OF FEDERALSBURG, MARYLAND, ASSIGNOR OF ONE-HALF HIS RIGHT TO EDWARD R. GOSLIN.

IMPROVEMENT IN FRUIT-DRIERS.

Specification forming part of Letters Patent No. 185,007, dated December 5, 1876; application filed October 9, 1875.

*To all whom it may concern:*

Be it known that I, WILLIAM H. WILEY, of Federalsburg, Dorchester county, Maryland, have invented an Improved Fruit-Drying Machine, of which the following is a specification:

The object of my invention is to improve fruit-drying machines by means of a horizontal drum with a hot-air cut-off, by which the fruit or any vegetable substance can be dried in trays without continuous rotation.

Figure 1:
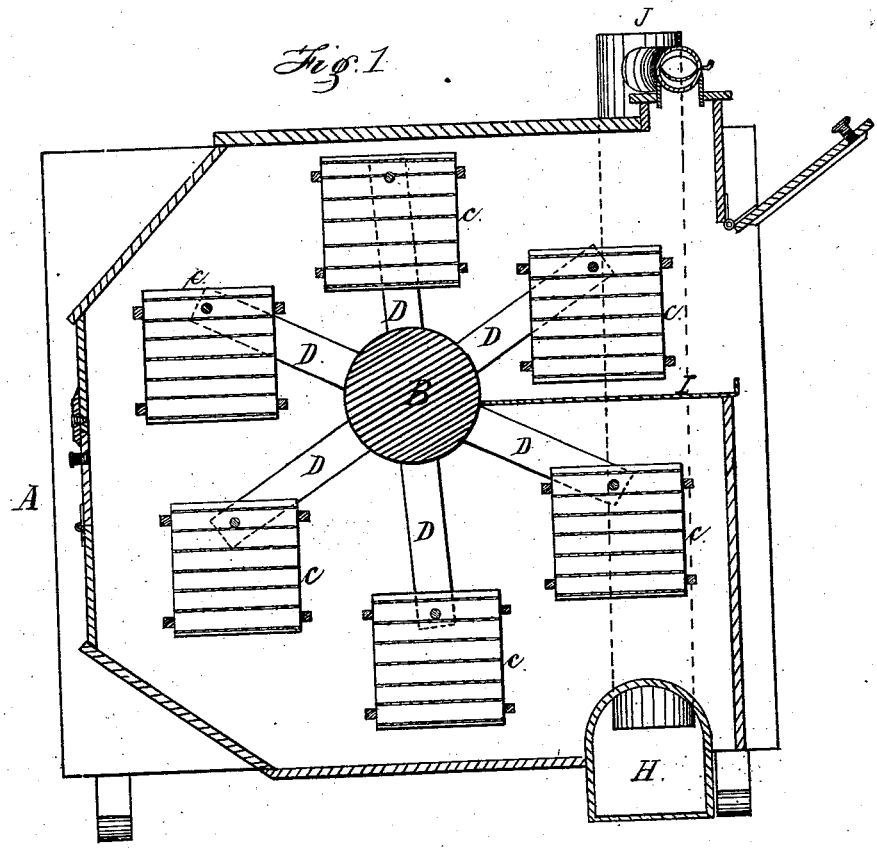
Figure 2:
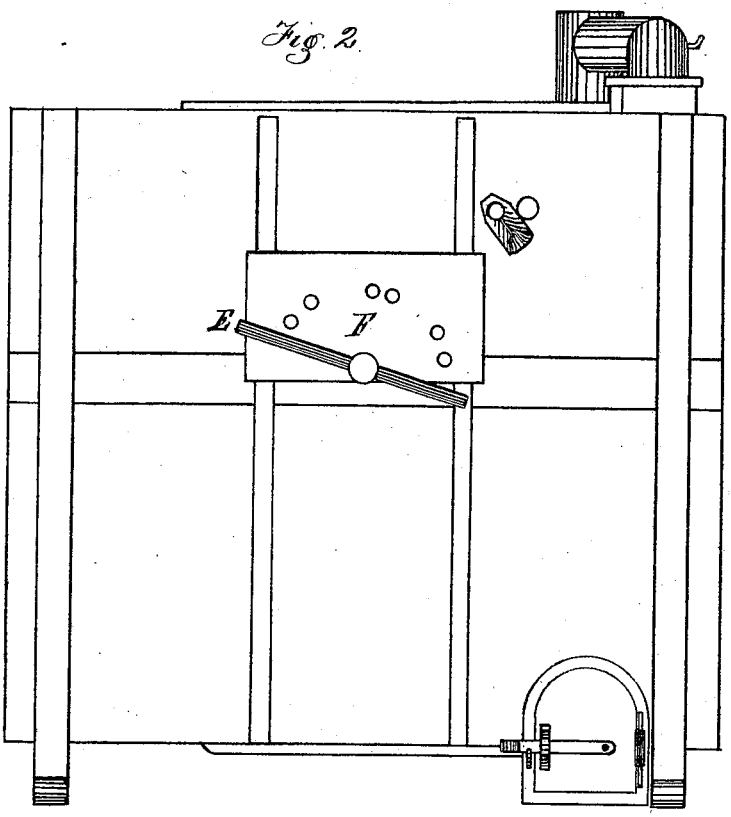

The following is a description of the figures represented in the annexed drawings:

A in Figure 1 designates a case of any suitable capacity, the lower end of which communicates with a heater by means of a hot-air generator extending the length of one end, with an opening of the whole length of the generator directly in the fruit-chambers. B designates an inclosed horizontal drum, composed of two circular sections connected together by a beam passing through the center, which has its bearings on the sides of the case A. In order to move the frames C, that hold the trays attached to the arms D, that project from the drum, a lever, E, is used, that passes through the beam that projects outside of case A, which is kept in position by means of a perforated board, F, attached to the case above, or, if desired, below the projecting arm, and secured by a pin. The rotation is regulated to suit the filling of the fruit-frames which contain the trays by this lever, and the frames revolve by motion of the lever.

The trays are of wire-cloth, suspended by the frames between arms extending from the horizontal drum or cylinder, and revolve by connection therewith in a movement known as the "merry-go-round," revolving, to suit the adjustment of the trays, over the arch connected with the heat-generator, through which heated air is to pass, so that a current of hot air is compelled to pass around the cylinder when stationary, through the trays, by means of a cut-off, (designated as I, Fig. 1,) that connects one end of the case A, near the door where the fruit enters, with the cylinder, as seen in Fig. 1. The hot air escapes through a steam-chest, which is directly over the cut-off, into a pipe connected with the smoke-stack J, as seen in Fig. 1. The draft of the hot air is regulated by a damper, Fig. 1, in the escape-pipe, connected with the smoke-stack.

By this means heated air may be so applied to the fruit as to produce dryness without burning or shrinkage, and the fruit will retain its freshness and sweetness. Sugar is used, if needed, in the process of drying.

Figure 3:
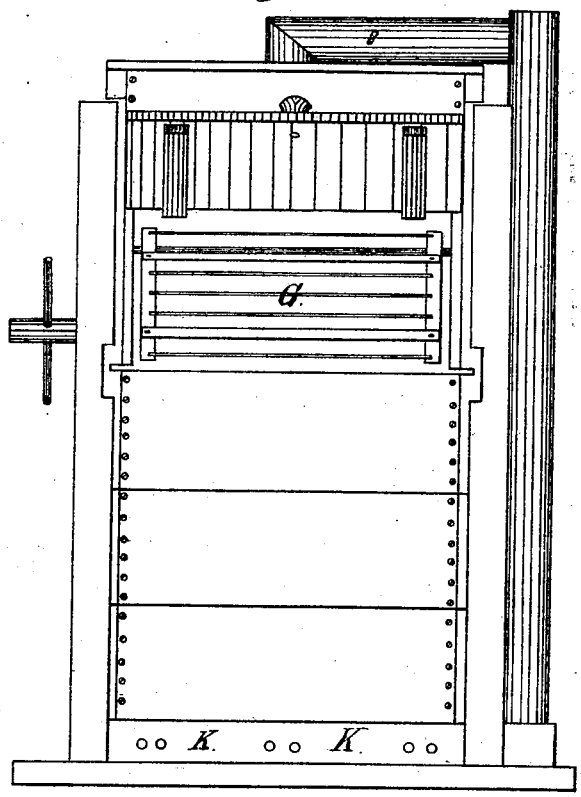

The cold air enters the case, as represented by the letter K in Fig. 3. The trays are all of uniform size, and can be increased in number to suit.

The improvement claimed is—

The combination, with the furnace and case A, of the revolving drum and arms and the removable partition I, located below the door, substantially as shown and described.

WILLIAM H. WILEY.

Witnesses:
 E. S. BRADSHAW,
 E. W. LE COMPTE.